US011488016B2

(12) United States Patent
Covell et al.

(10) Patent No.: US 11,488,016 B2
(45) Date of Patent: Nov. 1, 2022

(54) LOOK-UP TABLE BASED NEURAL NETWORKS

(71) Applicant: Google LLC, Mountain View, CA (US)

(72) Inventors: Michele Covell, Woodside, CA (US); David Marwood, Sunnyvale, CA (US); Shumeet Baluja, La Jolla, CA (US); Nicholas Johnston, San Jose, CA (US)

(73) Assignee: Google LLC, Mountain View, CA (US)

( * ) Notice: Subject to any disclaimer, the term of this patent is extended or adjusted under 35 U.S.C. 154(b) by 372 days.

(21) Appl. No.: 16/751,175

(22) Filed: Jan. 23, 2020

(65) Prior Publication Data

US 2020/0234126 A1 Jul. 23, 2020

Related U.S. Application Data

(60) Provisional application No. 62/796,083, filed on Jan. 23, 2019.

(51) Int. Cl.
*G06N 3/04* (2006.01)
*G06N 3/08* (2006.01)
*G06F 1/03* (2006.01)

(52) U.S. Cl.
CPC ............. *G06N 3/08* (2013.01); *G06F 1/03* (2013.01); *G06N 3/0481* (2013.01)

(58) Field of Classification Search
CPC ...... G06N 3/08; G06N 3/0481; G06N 3/0445; G06N 3/0454; G06N 3/063; G06N 3/084; G06F 1/03
See application file for complete search history.

(56) References Cited

U.S. PATENT DOCUMENTS 10,740,432 B1 * 8/2020 Diamant ............... G06F 7/5443
2018/0253635 A1 * 9/2018 Park ....................... G06F 7/523

OTHER PUBLICATIONS

Achterhold et al., "Variational Network Quantization," International Conference on Learning Representations (ICLR), 2018, 18 pages.
Anwar et al., "Fixed point optimization of deep convolutional neural networks for object recognition," 2015 IEEE International Conference on Acoustics, Speech and Signal Processing (ICASSP), Apr. 2015, 1131-1135.

(Continued)

*Primary Examiner* — Nghia M Doan
(74) *Attorney, Agent, or Firm* — Fish & Richardson P.C.

(57) ABSTRACT

Methods, systems, and apparatus, including computer programs encoded on computer storage media, for processing a network input using a neural network to generate a network output for the network input. One of the methods includes maintaining, for each of the plurality of neural network layers, a respective look-up table that maps each possible combination of a quantized input index and a quantized weight index to a multiplication result; and generating a network output from a network input, comprising, for each of the neural network layers: receiving data specifying a quantized input to the neural network layer, the quantized input comprising a plurality of quantized input values; and generating a layer output for the neural network layer from the quantized input to the neural network layer using the respective look-up table for the neural network layer.

20 Claims, 3 Drawing Sheets

(56) References Cited

OTHER PUBLICATIONS

Baluja et al., "No Multiplication? No Floating Point? No Problem! Training Networks for Efficient Inference," https://arxiv.org/abs/1809.09244v1, Sep. 2018, 15 pages.

Balzer et al., "Weight quantization in Boltzmann machines," Neural Networks, Jan. 1991, 4(3):405-409.

Cai et al., "Deep Learning with Low Precision by Half-Wave Gaussian Quantization," 2017 IEEE Conference on Computer Vision and Pattern Recognition (CVPR), Jul. 2017, 5406-5414.

Chatterjee, "Learning and Memorization," International Conference on Machine Learning, retrieved from URL <http://proceedings.mlr.press/v80/chatterjee18a/chatterjee18a.pdf>, Jul. 2018, 9 pages.

Choi et al., "Towards the Limit of Network Quantization," https://arxiv.org/abs/1612.01543v2, last revised Nov. 2017, 14 pages.

Courbariaux et al., "Binarized Neural Networks: Training Deep Neural Networks with Weights and Activations Constrained to +1 or −1," https://arxiv.org/abs/1602.02830v3, Mach 2016, 11 pages.

Courbariaux et al., "BinaryConnect: Training Deep Neural Networks with binary weights during propagations," Advances in Neural Information Processing Systems, Dec. 2015, 9 pages.

Covell et al., "Table-Based Neural Units: Fully Quantizing Networks for Multiply-Free Inference," https://arxiv.org/abs/1906.04798, Jun. 2019, 16 pages.

Deng et al., "Gated XNOR Networks: Deep Neural Networks with Ternary Weights and Activations under a Unified Discretization Framework," https://arxiv.org/abs/1705.09283vl, May 2017, 9 pages.

Deng et al., "ImageNet: A Large-Scale Hierarchical Image Database," 2009 IEEE Conference on Computer Vision and Pattern Recognition, Jun. 2009, 248-255.

Garland et al., "Low Complexity Multiply Accumulate Unit for Weight-Sharing Convolutional Neural Networks," IEEE Computer Architecture Letters, Jul. 2017, 16(2):6 pages.

Gong et al., "Compressing Deep Convolutional Networks using Vector Quantization," https://arxiv.org/abs/1412.6115, Dec. 2014, 10 pages.

Guo, "A Survey on Methods and Theories of Quantized Neural Networks," https://arxiv.org/abs/1808.04752vl, Aug. 2018, 17 pages.

Han et al., "Deep Compression: Compressing Deep Neural Networks with Pruning, Trained Quantization and Huffman Coding," https://arxiv.org/abs/1510.00149v3, Nov. 2015, 13 pages.

Han et al., "Deep Compression: Compressing Deep Neural Networks with Pruning, Trained Quantization and Huffman Coding," https://arxiv.org/abs/1510.00149v5, Feb. 2016, 14 pages.

He et al., "Deep Residual Learning for Image Recognition," https://arxiv.org/abs/1512.03385, Dec. 2015, 12 pages.

Howard et al., "MobileNets: Efficient Convolutional Neural Networks for Mobile Vision Applications," https://arxiv.org/abs/1704.04861, Apr. 2017, 9 pages.

Hubara et al., "Quantized Neural Networks: Training Neural Networks with Low Precision Weights and Activations," https://arxiv.org/abs/1609.07061, Sep. 2016, 29 pages.

Hwang et al., "Fixed-Point Feedforward Deep Neural Network Design Using Weights +1,0, and −1," 2014 IEEE Workshop on Signal Processing Systems (SiPS), Oct. 2014, 6 pages.

Ioffe, S. and Szegedy, C. Batch normalization: Accelerating deep network training by reducing internal covariate shift. In Proc. International Conference on Machine Learning, p. 448-456, 2015,.

Jacob, B., Kligys, S., Chen, B., Zhu, M., Tang, M., Howard, A., Adam, H., and Kalenichenko, D. Quantization and training of neural networks for efficient integerarithmetic-only inference. In Computer Vision and Pattern Recognition (CVPR), 2018.

Jain, A. K. Data clustering: 50 years beyond k-means. Pattern recognition letters, 31(8):651-666, 2010.

Kim, J., Hwang, K., and Sung, W. X1000 real-time phoneme recognition VLSI using feed-forward deep neural networks. In International Conference on Acoustics, Speech and Signal Processing (ICASSP), 2014.

Krishnamoorthi, R. Quantizing deep convolutional networks for efficient inference: A whitepaper. arXiv 1806.08342, 2018.

Krizhevsky, A., Sutskever, I., and Hinton, G. E. Imagenet classification with deep convolutional neural networks. In Advances in neural information processing systems,pp. 1097-1105, 2012.

Langhammer, M. and Baeckler, G. High density and performance multiplication for fpga. In IEEE Symposium on Computer Arithmetic, 2018,.

Li, H., De, S., Xu, Z., Studer, C., Samet, H., and Goldstein, T. Training quantized nets: A deeper understanding. In Advances in Neural Information Processing Systems, 2017.

Lin, D. D., Talathi S. S., and Annapureddy, V. S. Fixed point quantization of deep convolutional networks. CoRR, abs/1511.06393, 2015, URL http://arxiv.org/abs/1511.06393.

Loschilov, I. and Hutter, F. Sgdr: Stochastic gradient descent with warm restarts. arXiv 1608.03983, 2016.

Marchesi, M., Orlandi, G., Piazza, F., and Uncini, A. Fast neural networks without multipliers. IEEE transactions on Neural Networks, 4(1):53-62, 1993.

Miyashita, D., Lee, E., and Murmann, B. Convolutional neural networks using logarithmic data representation. arXiv 1603.01025, 2016.

Rastegari, M., Ordonez, V., Redmon, J., and Farhadi, A. XNOR-net: Imagenet classification using binary convolutional neural networks. In European Conference on Computer Vision, pp. 525-542. Springer, Oct. 2016.

Sabeetha, S., Ajayan, J., Shriram, S., Vivek, K., and Rajesh, V. A study of performance comparison of digital multipliers using 22nm strained silicon technology. In Proc. International Conference on Electronics and Communication Systems (ICECS), pp. 180184, 2015.

Salimans, T. and Kingma, D. P. Weight normalization: A simple reparameterization to accelerate training of deep neural networks. In Proceedings of the 30th International Conference on Neural Information Processing Systems,NIPS'16, 2016. URL http://dl.acm.org/citation.cfm?id=3157096.3157197.

Tang, C. Z. and Kwan, H. K. Multilayer feedforward neural networks with single powers-of-two weights. IEEE Transactions on Signal Processing, 41(8):2724-2727, 1993.

Tang, W., Hua, G., and Wang, L. How to train a compact binary neural network with high accuracy? In AAAI Conference on Artificial Intelligence, 2017.

Vanhoucke, V., Senior, A., and Mao, M. Improving the speed of neural networks on cpus. In NIPS Workshop on Deep Learning and Unsupervised Feature Learning, 2011.

Wang, H. and Song, M. Ckmeans. 1d. dp: optimal k-means clustering in one dimension by dynamic programming. The R journal, 3(2):29, 2011.

Warren, Jr., H. Hacker's delight: Number of leading zeros, 2013. URL http://www.hackersdelight.org/hdcodetxt/nlz.c.txt.

Wu, S., Li, G., Chen, F., and Shi, L. Training and inference with integers in deep neural networks. arXiv preprint arXiv:1802.04680, 2018.

Yi, Y., Hangping, Z., and Bin, Z. A new learning algorithm for neural networks with integer weights and quantized non-linear activation functions. In IFIP International Conference on Artificial Intelligence in Theory and Practice, pp. 427-431, Springer, 2008.

Zhou, A., Yao, A., Guo, Y., Xu, L., and Chen, Y. Incremenal network quantization: Towards lossless cnns with low-precision weights. In International Conference on Learning Representations (ICLR), 2017.

Zhou, S., Wu, Y., Ni, Z., Zhou, X., Wen, H., and Zou, Y. DoReFa-net: Training low bitwidth convolutional neural networks with low bitwidth gradients. arXiv arXiv: 1606.06160, Jun. 2016.

Zhu, C., Han, S., Mao, H., and Dally, W. J. Trained ternary quantization. arXiv 1612.01064, 2016.

\* cited by examiner

LOOK-UP TABLE BASED NEURAL NETWORKS

CROSS-REFERENCE TO RELATED APPLICATION

This application claims priority to U.S. Provisional Application No. 62/796,083, filed on Jan. 23, 2019. The disclosure of the prior application is considered part of and is incorporated by reference in the disclosure of this application.

BACKGROUND

This specification relates to determining outputs for neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that performs the multiplications required by a neural network using tables, i.e., look-up tables, instead of performing the multiplications in software or using hardware multipliers. This greatly reduces the amount of computational resources required to perform an inference for the neural network and allows inferences to be computed for the neural network with minimal latency. More particularly, the tables required to perform input-weight multiplications and to apply the activation function for a given neural network layer can be stored in on-chip memory, e.g., of a field-programmable gate array (FPGA) or an application-specific integrated circuit (ASIC) on which the neural network computations are being performed, and can therefore be repeatedly accessed to generate outputs quickly and while consuming minimal computational resources.

Particular embodiments of the subject matter described in this specification can be implemented so as to realize one or more of the following advantages.

Processing neural networks using look-up tables as described in this specification greatly reduces the amount of computational resources required to perform an inference for the neural network and allows inferences to be computed for the neural network with minimal latency, i.e., because the system computes inferences using the neural network without performing any multiplications and without requiring any support for floating point numbers. In particular, the tables required to perform input-weight multiplications and to apply activation functions for any given layer can be stored in on-chip memory of the special-purpose hardware, e.g., on-chip memory of an FPGA or an ASIC on which the neural network computations are being performed, and can therefore be repeatedly accessed to generate outputs quickly and while consuming minimal computational resources. Additionally, because performing inference through the neural network using tables as described in this specification does not require circuitry for performing multiplication, for computing non-linearities or support for floating point numbers, the system can deploy the neural network on hardware, e.g., ASICS or FPGA, that has greatly reduced complexity, surface area, and power consumption relative to what would be required for deploying neural networks for conventional inference.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system implemented as computer programs on one or more computers in one or more locations that processes inputs using a neural network. In particular, for all of the multiplications required by the neural network, the system identifies the product of the multiplication using one or more look-up tables instead of performing the multiplication in software or using hardware multipliers. More specifically, the system computes inferences using the neural network without performing any multiplications and without requiring any support for floating point numbers.

The neural network can be configured to receive any kind of digital data input and to generate any kind of score, classification, or regression output based on the input.

In some cases, the neural network is a convolutional neural network that is configured to receive an input image and to process the input image to generate a network output for the input image, i.e., to perform some kind of image processing task. For example, the task may be image classification and the output generated by the neural network for a given image may be scores for each of a set of object categories, with each score representing an estimated likelihood that the image contains an image of an object belonging to the category. As another example, the task can be image embedding generation and the output generated by the neural network can be a numeric embedding of the input image. As yet another example, the task can be object detection and the output generated by the neural network can identify locations in the input image at which particular types of objects are depicted.

As another example, if the inputs to the neural network are Internet resources (e.g., web pages), documents, or portions of documents or features extracted from Internet resources, documents, or portions of documents, the task can be to classify the resource or document, i.e., the output generated by the neural network for a given Internet resource, document, or portion of a document may be a score for each of a set of topics, with each score representing an estimated likelihood that the Internet resource, document, or document portion is about the topic.

As another example, if the inputs to the neural network are features of an impression context for a particular advertisement, the output generated by the neural network may be a score that represents an estimated likelihood that the particular advertisement will be clicked on.

As another example, if the inputs to the neural network are features of a personalized recommendation for a user, e.g., features characterizing the context for the recommendation, e.g., features characterizing previous actions taken by the user, the output generated by the neural network may be a score for each of a set of content items, with each score representing an estimated likelihood that the user will respond favorably to being recommended the content item.

As another example, if the input to the neural network is a sequence of text in one language, the output generated by the neural network may be a score for each of a set of pieces of text in another language, with each score representing an estimated likelihood that the piece of text in the other language is a proper translation of the input text into the other language.

As another example, if the input to the neural network is a sequence representing a spoken utterance, the output generated by the neural network may be a score for each of a set of pieces of text, each score representing an estimated likelihood that the piece of text is the correct transcript for the utterance.

As another example, the neural network can be part of a reinforcement learning system or other control system and can generate outputs used for selecting actions to be performed by an agent interacting with an environment.

More generally, the neural network can be recurrent neural network or a feedforward neural network, e.g., a convolutional neural network or an attention-based neural network, or may have both recurrent and feedforward layers.

Figure 1:
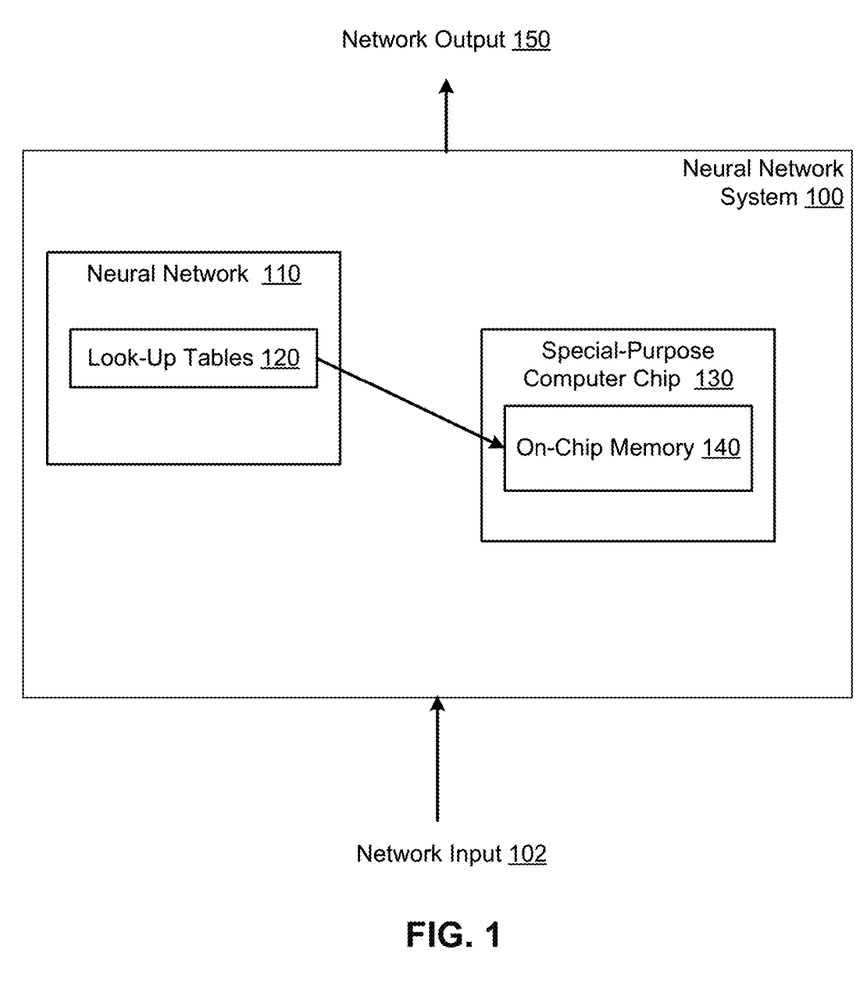
FIG. 1 shows an example neural network system.

FIG. 1 shows an example neural network system 100. The neural network system 100 is an example of a system implemented as computer programs on one or more computers in one or more locations, in which the systems, components, and techniques described below can be implemented.

The neural network system 100 is a system that receives data specifying a neural network 110 and then uses the neural network 110 to process network inputs 102 to generate network outputs 150.

As a particular example, the system 100 can receive the data specifying the neural network 110 and deploy the neural network on special-purpose hardware, e.g., a special-purpose computer chip 130, e.g., an ASIC or an FPGA, that has on-chip memory 140 and uses hardware acceleration to perform the operations required by the neural network. Once the neural network has been deployed, the system 100 can process network inputs 102 using the special-purpose hardware, e.g., the special-purpose computer chip 130, to generate network outputs 150.

As one example, the system 100 can be implemented in the cloud and can receive network inputs 102 from client devices over a data communication network, generate network outputs 150 from the network inputs 102, and transmit the network outputs 150 to the corresponding client devices over the data communication network.

As another example, the system 100 can be implemented on a user device, e.g., a mobile device, a tablet computer, a smart speaker or other smart device, or another user computer that is configured with special-purpose hardware on which the system 100 can deploy the neural network 110. In this example, the system 100 can receive network inputs 102 from other software programs running on the user device, generate network outputs 150 from the network inputs 102, and provide the network outputs 150 to the corresponding software programs.

In particular, the system 100 implements or deploys the neural network 110 using a set of look-up tables 120.

Generally, a look-up table is an array that maps one or more inputs to a corresponding output. By using a look-up table, the system can identify ("lookup") the output for an input without needing to compute the output either in software or in hardware.

More specifically, the neural network includes multiple neural network layers. Each of the neural network layers generates an output by performing multiplications between weights for the neural network layer and layer input values, accumulating subsets of the results of those multiplications, and then, optionally, applying an activation function to the accumulated values.

One example of such computations is a matrix multiply between an input vector and a matrix of weights, e.g., as performed by a recurrent neural network layer, a fully-connected neural network layer, or a self-attention neural network layer.

Another example of such a computation is a convolution between a kernel and an input tensor, e.g., as performed by a convolutional neural network layer.

The data specifying the neural network 110 that is received by the system 100 specifies the architecture of the neural network and, as such, defines, for each accumulated value that is generated during the processing of a given network input 102, the subsets of multiplication results that need to be summed in order to generate the accumulated value.

To generate a network output 150 for the neural network 110, the system 100 identifies the outputs of the multiplications required by the layers of the neural network 110, i.e., the output required to generate accumulated values, using the look-up tables 120 instead of performing the multiplications in software or using hardware multipliers.

In other words, rather than performing any given multiplication, e.g., between a weight and a layer input, the system looks up the multiplication result, e.g., the product of the weight and the layer input, in one of the look-up tables 120.

This greatly reduces the amount of computational resources required to perform an inference for the neural network and allows inferences to be computed for the neural network with minimal latency.

More particularly, the tables 120 required to perform input-weight multiplications and to apply activation functions for any given layer can be stored in the on-chip memory 140 of the special-purpose hardware, e.g., on-chip memory of an FPGA or an ASIC on which the neural network computations are being performed, and can therefore be repeatedly accessed to generate outputs quickly and while consuming minimal computational resources.

That is, when performing the required computation for a given neural network layer, the special-purpose computer chip 130 is only required to load the look-up tables 120 that are relevant to the given neural network layer into the on-chip memory 140 and to use the look-up tables 120 to identify the required multiplication outputs and non-linearity outputs necessary to perform the computation of the given layer for the current input.

Additionally, because performing inference through the neural network 110 using tables 120 as described in this specification does not require circuitry for performing multiplication, for computing non-linearities or, as will be described in more detail below, support for floating point numbers, the system 100 can deploy the neural network 110 on hardware that has greatly reduced complexity, surface area, and power consumption relative to what would be required for deploying neural networks for conventional inference.

The look-up tables 120 used by the system 100 for a given neural network layer in the neural network 110 are described in more detail below with reference to FIG. 2.

Figure 2:
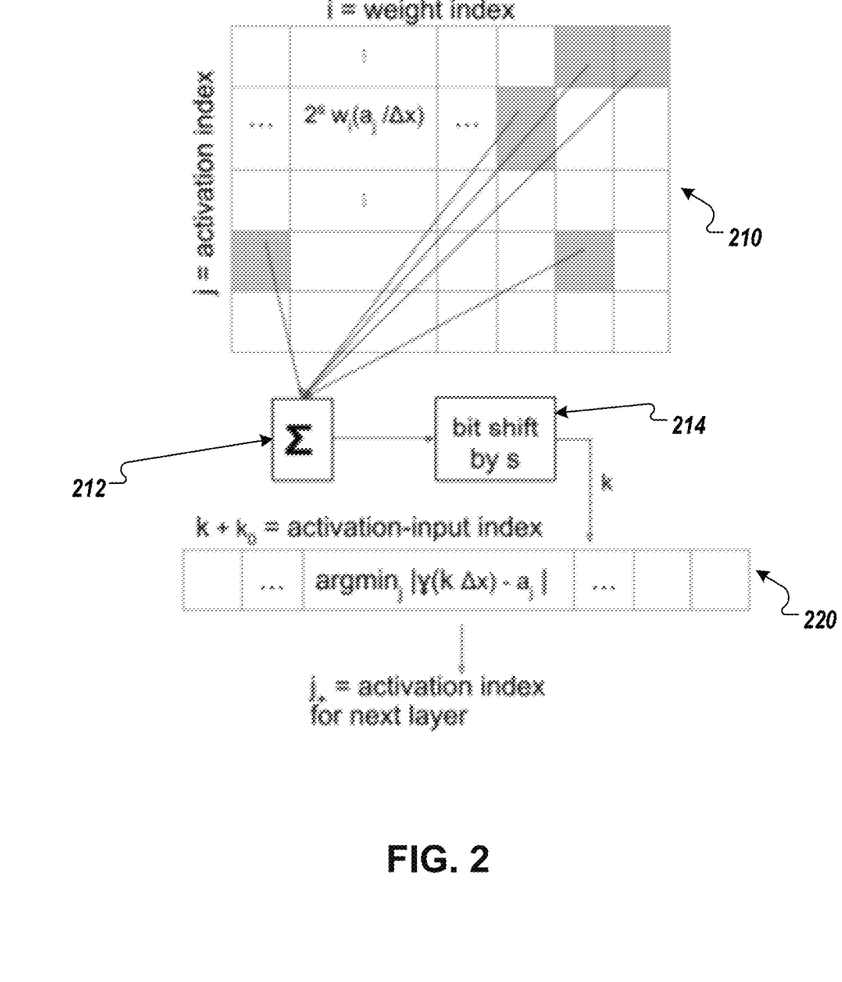
FIG. 2 illustrates an example of determining an output for one of the neural network layers in the neural network using look-up tables.

FIG. 2 illustrates an example of determining an output for one of the neural network layers using look-up tables.

In particular, as shown in FIG. 2, the system maintains two look-up tables for the neural network layer: a first look-up table 210 and an activation table 220.

The look-up table 210 maps each possible combination of a quantized input index and a quantized weight index to a multiplication result.

Each quantized input index represents a quantized input value from a set of possible quantized input values.

Similarly, each quantized weight index represents a quantized weight value from a set of possible quantized weight values.

The multiplication result to which a given quantized input index—quantized weight index pair is mapped is the result of a multiplication between the corresponding quantized input value and the corresponding quantized weight value.

In more detail, the system 100 either receives or generates weights, e.g., the parameters and biases, of the layers of the neural network 110, that are quantized. A quantized weight value is one that can only take one of a relatively small, discrete, and predetermined number of values.

For example, each quantized weight value may be generated from a corresponding floating point value by mapping to the closest one of the possible quantized values according to a quantization scheme. In particular, how many quantized values there are, i.e., the number of quantization "levels," which quantized values are selected from the range of possible values for the weights, and the step sizes between the different quantized values in the set, are both determined by the quantization scheme. A few examples of quantization schemes are described below.

Similarly, the system also operates on quantized inputs. That is, the system either receives network inputs that are already quantized or, if the inputs are not yet quantized, can either (i) quantize the input values to the network's activation quantization levels or (ii) use a separate look-up table for multiplying the network's inputs by the same quantized weights as used elsewhere. The system then maintains the values as quantized values during the processing of the network inputs through the neural network.

In particular, entry at row i column j of the table 210 stores the closest integer to $$\frac{2^s}{\Delta x} w_i a_j,$$

where $a_j$ is the quantized input value represented by the quantized input index j, $w_i$ is the quantized weight value represented by the quantized weight index i, $2^s$ is the fixed-point scaling factor, and $\Delta x$ is the quantization step used in the activation table 220. The entries in the table 210 are therefore all integers and can all be pre-computed before the neural network is deployed by the system.

Thus, the first table 210 contains $N_a N_w$ elements: the number of activation quantization levels, $N_a$, times the number of weight quantization levels, $N_w$.

When quantization levels for the different layers in the neural network are not shared, i.e., the quantization levels are different for the weights of different layers in the neural network or for the activations generated by different layers of the neural network, the table 210 will be different for any two layers that do not share the same quantization levels. However, given that the neural network is executed layer by layer, only the table 210 for the layer currently being executed needs to be in the on-chip memory of the special-purpose hardware at any given time.

As described above, computing the output of the neural network layer generally requires computing a plurality of accumulated values and then, optionally, applying an activation function to each accumulated value to generate the output.

The system makes use of the first table 210 to generate each of the accumulated values. In particular, each accumulated value is typically generated by summing the outputs of respective weight value—input multiplications, i.e., by summing the results of a corresponding subset of the multiplications. Which multiplications are performed and which subsets are used to generate the accumulate value is based on the configuration of the neural network layer, i.e., whether the accumulated value is part of a convolution computation or a matrix multiplication computation.

FIG. 2 shows the generation of a particular accumulated value using the first table 210. In particular, the particular accumulated value is the sum of five quantized weight value—quantized input value multiplications.

For each of these multiplications, the system determines the quantized input index representing the quantized input value, determines the quantized weight index representing the quantized weight value, and identifies, as the result of the multiplication, the multiplication result mapped to in the table 210 by the determined quantized input index and the determined quantized weight index.

The system then sums 212 the multiplication results of the subset corresponding the particular accumulated value to generate a scaled quantized accumulated value.

To account for neural network layers that have biases, the system can also add a bias value, i.e., an element from a bias vector for the neural network layer, to the accumulated value by adding the entry that is mapped to by the index for the quantized input value corresponding to the bias value and the index for the weight value corresponding to 1.

The complete set of scaled quantized accumulated values can be considered to be the output of the linear transformation applied by the neural network layer.

As shown in FIG. 2, some or all of the layers of the neural network can also apply a non-linear activation function to each accumulated value to generate the final output of the neural network layer. To generate these outputs without performing multiplication or having to directly apply the non-linearity, the system can use the activation table 220.

The activation table 220 maps each of a plurality of accumulated value indices that each represent a possible accumulated value from the plurality of possible accumulated values to a respective quantized input index that represents the quantized input value that is generated by applying the activation function for the neural network layer to the possible accumulated value. More specifically, each entry in the activation table 220 maps to a quantized input index that represents the quantized input value that is the closest to the output of the activation function for the accumulated value represented by the accumulated value indices.

Thus, the activation table 220 is generally of size Nx, where Nx is the number of quantization steps needed to fully span a quantized range of outputs of the activation function.

Note that, in some cases, the number of entries in the activation table can be more than Na (the number of distinct quantized activation levels) if the activation function does not change level at a uniform rate (e.g., quantized tan h).

To index into the activation table 220, the system can shift 214 the accumulated value by a number of bits that removes the scaling factor, i.e., by s bits, to generate a shifted accumulated value. When the index for the value zero is not also zero, the system indexes into the activation table by adding an offset, i.e., adding the index for the value zero, to the shifted accumulated value to determine the accumulated value index.

The system then uses the activation table 220 to map the accumulated value index to an activation value index, which serves as the activation value index when using the output of the current layer as the input to the next layer in the neural network.

If the current layer is the last layer of the neural network, i.e., the output of the current layer should be the output of the neural network, the system can look up the value of the output of the activation function for each accumulated value by looking up the entry that corresponds to the activation value index and the index representing a weight value of 1.

The system can then identify, as the output of the neural network, the outputs of the activation function or data identifying which positions in the output of the current layer have the top N, e.g., top 1 or top 5, highest values.

To determine which weight value index should be used for any given multiplication, the system can maintain weight data. The weight data is a third table that specifies, for each weight of the neural network, the quantized weight index representing the quantized weight value for the weight.

Thus, to determine the quantized weight index representing any given quantized weight value, the system can determine the quantized weight index specified for the weight in the maintained weight data.

While this weight data can be large, i.e., because maintaining the weight data requires a respective entry for each weight in the neural network, the sequencing for the neural network computation is both fixed and predictable, allowing the system to access this data in predefined sections efficiently. Thus, this weight data does not need to all fit directly on chip at once, and the system can load, e.g., only the portion of the weight data corresponding to the weights of the current neural network layer being processed, onto the special purpose hardware when loading the first table 210 and the activation table 220 onto the special purpose hardware.

Thus, the system can compute the outputs of all of the layers of the neural network using only the respective first and activation tables for each of the layers and the weight data. Because each first table has entries that are integers and the other entries in the other tables are all indices, no floating point values are used in generating a network output. Thus, the special-purpose hardware is not required to perform multiplication or to support floating point values.

Figure 3:
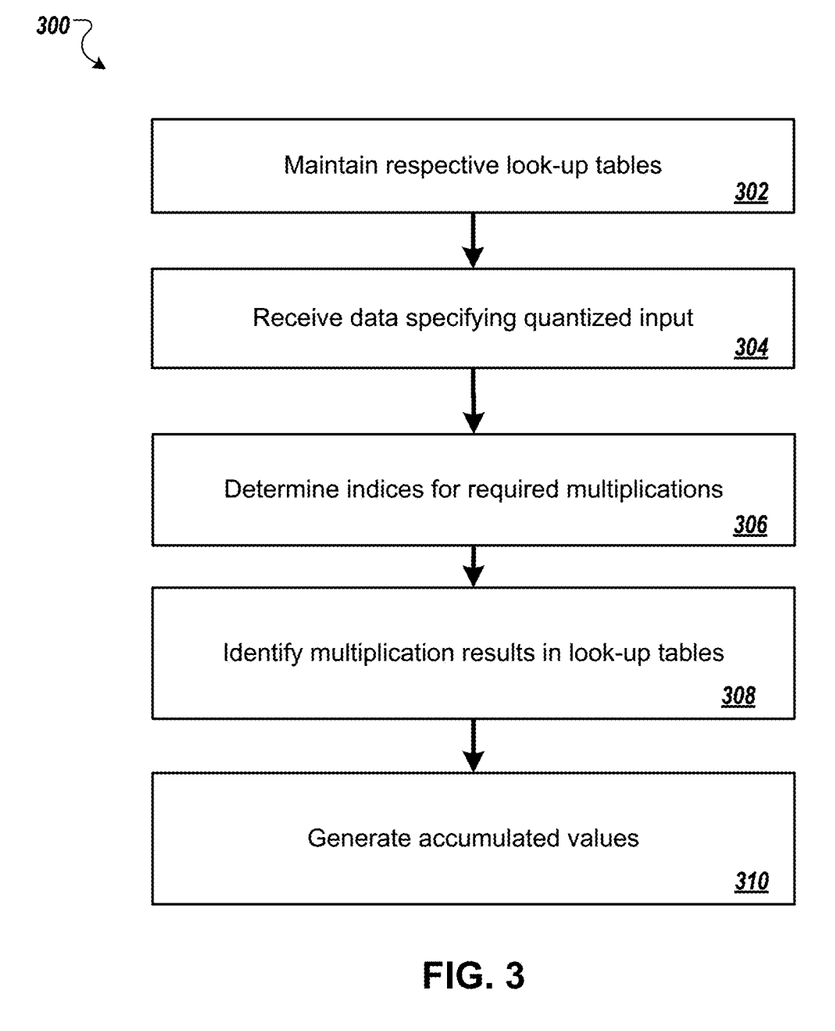
FIG. 3 is a flow diagram of an example process for determining a network output for a network input.

FIG. 3 is a flow diagram of an example process 300 for generating a network output from a network input. For convenience, the process 300 will be described as being performed by a system of one or more computers located in one or more locations. For example, a neural network system, e.g., the neural network system 100 of FIG. 1, appropriately programmed in accordance with this specification, can perform the process 300.

The system maintains, for each of the plurality of neural network layers, a respective look-up table that maps each possible combination of a quantized input index and a quantized weight index to a multiplication result (step 302). As described above, when all of the neural network layers use the same quantization levels, this look-up table can be shared between all of the neural network layers. When the neural network layers use different quantization levels, this look-up table is only shared among neural network layers that use the same quantization levels.

The system receives data specifying a quantized input to the neural network layer that includes a plurality of quantized input values (step 304).

For each multiplication between a quantized weight and a corresponding quantized input value that is required to generate the layer output for the neural network layer, the system determines the quantized input index representing the quantized input value and determines the quantized weight index representing the quantized weight value (step 306).

For each multiplication between a quantized weight and a corresponding quantized input value that is required to generate the layer output for the neural network layer, the system identifies, as the result of the multiplication, the multiplication result that is mapped to in the respective look-up table for the neural network layer by the determined quantized input index and the determined quantized weight index (step 308).

The system then generates a plurality of accumulated values by, for each accumulated value, summing the identified results of the corresponding subset of the plurality of multiplications (step 310).

As described above, the system performs inferences for the neural network using quantized weight values and quantized activation values. In some implementations, the weights and network inputs are quantized and provided to the system by an external system.

In some other implementations, the system quantizes the weight values and activation values using one or more quantization schemes.

In some of these implementations, the system obtains trained floating point weight values for the neural network and quantizes the trained floating point weight values using a conventional quantization scheme.

In some others of these implementations, the system perform quantization-aware training of the neural network on a set of training data in order to ensure that the trained neural network can still perform well after being quantized.

In some of these implementations, the system can optimize the training in any of a variety of ways to improve the performance of the trained, quantized weight values.

For example, the system can make a modification to conventional gradient-based training to allow backwards error-propagation through quantized activations. In particular, the system can use the "straight-through estimator" (STE) (Hinton, 2012). That is, during training, the discretized activations use the gradients that would have been provided by the non-discretized versions, i.e., the floating-point versions of the activations.

As another example, the system can periodically update the quantization scheme during the quantization-aware training. In particular, the system identifies new quantization centers once every S training steps, where S is a constant value, e.g., 1000, 500, or 250. That is, every S training steps, the system replaces each weight (and bias) with its assigned quantization center as computed at that training step. This temporarily reduces the number of unique weights and biases to Nw. After this quantization event, training continues with no modifications until the next multiple-of-S training step. Between the quantization events, the weights diverge from the quantized levels. Nonetheless, these periodic reinforcements of the selected levels ensures that the final quantization event is not detrimental to performance after training.

In any of these implementations, the system can use any of a variety of quantization schemes in quantizing the weights and activations, i.e., in determining the quantization levels for the weights and for the activations. A variety of examples of quantization schemes that can be used are described in "Table-Based Neural Units: Fully Quantizing Networks for Multiply-Free Inference," arXiv:1906.04798 the entire contents of which are hereby incorporated by reference herein in their entirety, and "NO MULTIPLICATION? NO FLOATING POINT? NO PROBLEM! TRAINING NETWORKS FOR EFFICIENT INFERENCE," arXiv 1809.09244.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of processing a network input using a neural network to generate a network output for the network input, wherein the neural network comprises a plurality of neural network layers, wherein each neural network layer has a plurality of weights, and wherein each neural network layer generates a layer output at least in part by performing a plurality of multiplications, each multiplication being a multiplication between a weight of the neural network layer and an input value from a layer input to the neural network layer, and generating a plurality of accumulated values that are each based at least in part on a sum of results of a subset of plurality of multiplications, and the method comprising:
   maintaining, for each of the plurality of neural network layers, a respective look-up table that maps each possible combination of a quantized input index and a quantized weight index to a multiplication result, wherein each quantized input index represents to a quantized input value from a set of possible quantized input values, each quantized weight index represents a quantized weight value from a set of possible quantized weight value, and the multiplication result is a result of a multiplication between the quantized input value and the quantized weight value;
   receiving the network input; and
   generating the network output from the network input, comprising, for each of the neural network layers:
      receiving data specifying a quantized input to the neural network layer, the quantized input comprising a plurality of quantized input values; and
      generating a layer output for the neural network layer from the quantized input to the neural network layer, comprising:

for each multiplication between a quantized weight and a corresponding quantized input value that is required to generate the layer output for the neural network layer:
- determining the quantized input index representing the quantized input value;
- determining the quantized weight index representing the quantized weight value; and
- identifying, as the result of the multiplication, the multiplication result mapped to in the respective look-up table for the neural network layer by the determined quantized input index and the determined quantized weight index; and generating a plurality of accumulated values, comprising for each accumulated value, summing the identified results of the corresponding subset of the plurality of multiplications.

2. The method of claim 1, further comprising:
maintaining weight data specifying, for each weight of the neural network, the quantized weight index representing the quantized weight value for the weight, wherein determining the quantized weight index representing the quantized weight value comprises:
determining the quantized weight index specified for the weight in the maintained weight data.

3. The method of claim 1 wherein the data specifying the quantized input values is the respective quantized input indices for the quantized activation values.

4. The method of claim 1, wherein one or more of the plurality of neural network layers applies an activation function to each accumulated value generated by the neural network layer to generate the layer output for the neural network layer, the method further comprising:
maintaining for each of the one or more neural network layers, a respective activation table that maps each of a plurality of accumulated value indices that each represent a possible accumulate value from the plurality of possible accumulated values to a respective quantized input index that represents the quantized input value that is generated by applying the activation function to the possible accumulated value, and
for each neural network layer that applies the activation function:
for each accumulated value generated for the neural network layer, identifying the accumulated value index that represents the accumulated value and mapping, using the activation table for the neural network layer, the identified accumulated value index to a quantized input index.

5. The method of claim 4, wherein the multiplication result in the look up table is a closest integer to a product of the multiplication between the quantized input value and the quantized weight value scaled by a fixed-point scaling factor and divided by a quantization step used in the activation table.

6. The method of claim 5, wherein for each accumulated value generated for the neural network layer, identifying the accumulated value index that represents the accumulated value and mapping, using the activation table, the identified accumulated value index to a quantized input index comprises:
shifting the accumulated value by a number of bits that removes the scaling factor to generate a shifted accumulated value; and
adding an offset to the shifted accumulated value to determine the quantized input index.

7. The method of claim 1, wherein the activation table is of size Nx, where Nx is a number of quantization steps needed to fully span a quantized range of outputs of the activation function.

8. The method of claim 1, wherein the look-up table contains Na by Nw elements, where Na is a number of input quantization levels and Nw is a number of weight quantization levels.

9. The method of claim 1, wherein each neural network layer also includes a plurality of bias elements, wherein each accumulated value is also based on at least one of the bias elements, and wherein generating the plurality of accumulated values further comprises adding the at least one bias element to the sum of the multiplication results.

10. The method of claim 1, wherein the neural network has been trained using a quantization-aware training procedure that periodically updates a quantization scheme used to quantize weights of the neural network during the training.

11. One or more non-transitory computer-readable storage media storing instructions that when executed by one or more computers cause the one or more computers to perform operations for processing a network input using a neural network to generate a network output for the network input, wherein the neural network comprises a plurality of neural network layers, wherein each neural network layer has a plurality of weights, and wherein each neural network layer generates a layer output at least in part by performing a plurality of multiplications, each multiplication being a multiplication between a weight of the neural network layer and an input value from a layer input to the neural network layer, and generating a plurality of accumulated values that are each based at least in part on a sum of results of a subset of plurality of multiplications, and the method comprising:
maintaining, for each of the plurality of neural network layers, a respective look-up table that maps each possible combination of a quantized input index and a quantized weight index to a multiplication result, wherein each quantized input index represents to a quantized input value from a set of possible quantized input values, each quantized weight index represents a quantized weight value from a set of possible quantized weight value, and the multiplication result is a result of a multiplication between the quantized input value and the quantized weight value;
receiving the network input; and
generating the network output from the network input, comprising, for each of the neural network layers:
receiving data specifying a quantized input to the neural network layer, the quantized input comprising a plurality of quantized input values; and
generating a layer output for the neural network layer from the quantized input to the neural network layer, comprising:
for each multiplication between a quantized weight and a corresponding quantized input value that is required to generate the layer output for the neural network layer:
- determining the quantized input index representing the quantized input value;
- determining the quantized weight index representing the quantized weight value; and
- identifying, as the result of the multiplication, the multiplication result mapped to in the respective look-up table for the neural network layer by the determined quantized input index and the determined quantized weight index; and generating a plurality of accumulated values, comprising for each accumulated value, summing the identified results of the corresponding subset of the plurality of multiplications.

12. A system comprising one or more computers and one or more storage devices storing instructions that when executed by one or more computers cause the one or more computers to perform operations for processing a network input using a neural network to generate a network output for the network input, wherein the neural network comprises a plurality of neural network layers, wherein each neural network layer has a plurality of weights, and wherein each neural network layer generates a layer output at least in part by performing a plurality of multiplications, each multiplication being a multiplication between a weight of the neural network layer and an input value from a layer input to the neural network layer, and generating a plurality of accumulated values that are each based at least in part on a sum of results of a subset of plurality of multiplications, and the method comprising:
 maintaining, for each of the plurality of neural network layers, a respective look-up table that maps each possible combination of a quantized input index and a quantized weight index to a multiplication result, wherein each quantized input index represents to a quantized input value from a set of possible quantized input values, each quantized weight index represents a quantized weight value from a set of possible quantized weight value, and the multiplication result is a result of a multiplication between the quantized input value and the quantized weight value;
 receiving the network input; and
 generating the network output from the network input, comprising, for each of the neural network layers:
  receiving data specifying a quantized input to the neural network layer, the quantized input comprising a plurality of quantized input values; and
  generating a layer output for the neural network layer from the quantized input to the neural network layer, comprising:
   for each multiplication between a quantized weight and a corresponding quantized input value that is required to generate the layer output for the neural network layer:
    determining the quantized input index representing the quantized input value;
    determining the quantized weight index representing the quantized weight value; and
    identifying, as the result of the multiplication, the multiplication result mapped to in the respective look-up table for the neural network layer by the determined quantized input index and the determined quantized weight index; and
   generating a plurality of accumulated values, comprising for each accumulated value, summing the identified results of the corresponding subset of the plurality of multiplications.

13. The system of claim 12, the operations further comprising:
 maintaining weight data specifying, for each weight of the neural network, the quantized weight index representing the quantized weight value for the weight, wherein determining the quantized weight index representing the quantized weight value comprises:
  determining the quantized weight index specified for the weight in the maintained weight data.

14. The system of claim 12 wherein the data specifying the quantized input values is the respective quantized input indices for the quantized activation values.

15. The system of claim 12, wherein one or more of the plurality of neural network layers applies an activation function to each accumulated value generated by the neural network layer to generate the layer output for the neural network layer, the method further comprising:
 maintaining for each of the one or more neural network layers, a respective activation table that maps each of a plurality of accumulated value indices that each represent a possible accumulate value from the plurality of possible accumulated values to a respective quantized input index that represents the quantized input value that is generated by applying the activation function to the possible accumulated value, and
 for each neural network layer that applies the activation function:
  for each accumulated value generated for the neural network layer, identifying the accumulated value index that represents the accumulated value and mapping, using the activation table for the neural network layer, the identified accumulated value index to a quantized input index.

16. The system of claim 15, wherein the multiplication result in the look up table is a closest integer to a product of the multiplication between the quantized input value and the quantized weight value scaled by a fixed-point scaling factor and divided by a quantization step used in the activation table.

17. The system of claim 16, wherein for each accumulated value generated for the neural network layer, identifying the accumulated value index that represents the accumulated value and mapping, using the activation table, the identified accumulated value index to a quantized input index comprises:
 shifting the accumulated value by a number of bits that removes the scaling factor to generate a shifted accumulated value; and
 adding an offset to the shifted accumulated value to determine the quantized input index.

18. The system of claim 16, wherein the activation table is of size Nx, where Nx is a number of quantization steps needed to fully span a quantized range of outputs of the activation function.

19. The system of claim 12, wherein the look-up table contains Na by Nw elements, where Na is a number of input quantization levels and Nw is a number of weight quantization levels.

20. The system of claim 12, wherein each neural network layer also includes a plurality of bias elements, wherein each accumulated value is also based on at least one of the bias elements, and wherein generating the plurality of accumulated values further comprises adding the at least one bias element to the sum of the multiplication results.

* * * * *

UNITED STATES PATENT AND TRADEMARK OFFICE
CERTIFICATE OF CORRECTION

| | |
|---|---|
| PATENT NO. | : 11,488,016 B2 |
| APPLICATION NO. | : 16/751175 |
| DATED | : November 1, 2022 |
| INVENTOR(S) | : Covell et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 464 days.

Signed and Sealed this
Twenty-eighth Day of November, 2023

Katherine Kelly Vidal
*Director of the United States Patent and Trademark Office*